July 21, 1931.  H. PROBST  1,815,797
SWITCHING STATION
Filed July 8, 1927

Inventor:
Heinrich Probst,
by *Alexander S. Lunn*
His Attorney.

Patented July 21, 1931

1,815,797

UNITED STATES PATENT OFFICE

HEINRICH PROBST, OF BERLIN, GERMANY, ASSIGNOR TO GENERAL ELECTRIC COMPANY, A CORPORATION OF NEW YORK

SWITCHING STATION

Application filed July 8, 1927, Serial No. 204,388, and in Germany September 16, 1926.

My invention relates to switching stations, particularly those adapted for the control of electric power systems of a relatively high potential and an object of my invention is the provision of an improved switching station affording a high degree of protection, both to the operating force and to the apparatus and facilitating the inspection or repair of the apparatus.

My invention will be better understood from the following description taken in connection with the accompanying drawings, and its scope will be pointed out in the appended claims.

Figure 1:
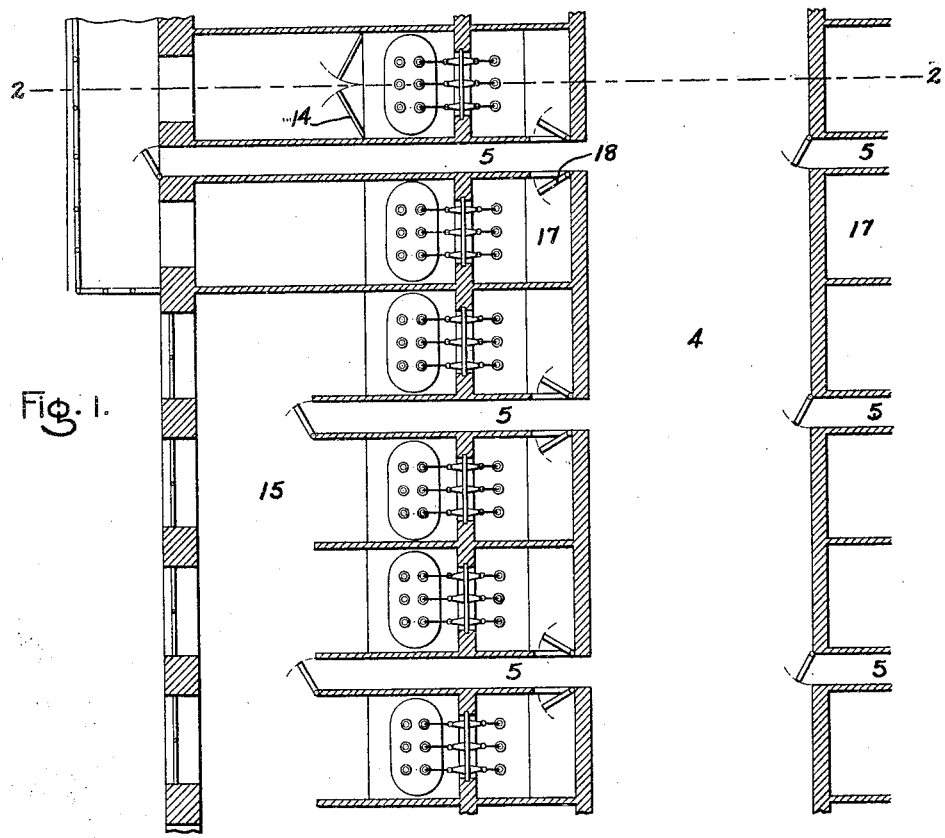
Figure 2:
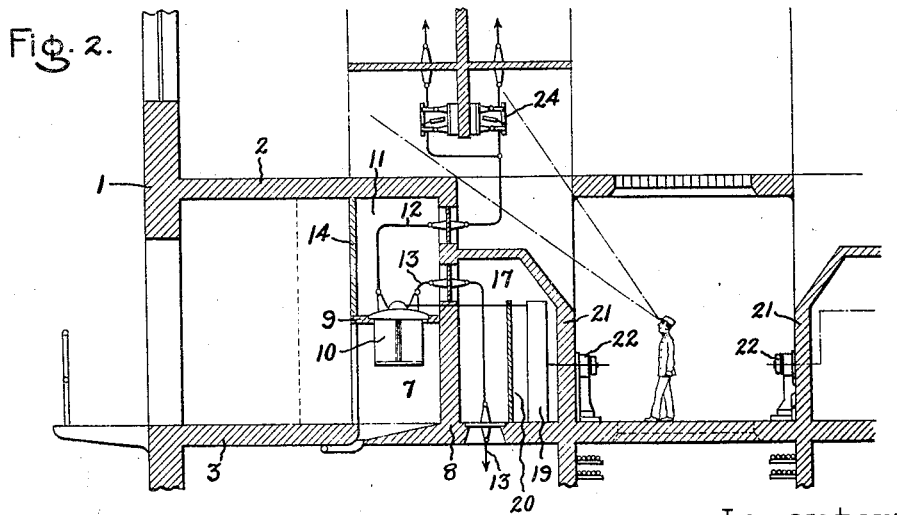

Referring to the drawings, Fig. 1 is a plan view of a station involving my invention, and Fig. 2 is a sectional view of the same taken on the line 2—2 of Fig. 1.

The switching station which I have illustrated comprises a building structure, which for example may be of concrete, having the outer wall 1 and the floors 2 and 3 with which are formed the switch and mechanism cells. These cells are arranged in parallel rows facing each other and separated by a main gangway 4. The cells are made in groups of two each, between which extend side gangways 5, the latter being on opposite sides of the main gangway. Each switch cell 7 is closed at the front by the wall 8 and has a horizontal wall 9 upon which rests the cover of the switch 10, the cover making a gas-tight joint with the wall. Through the chamber or room 11 comprising the upper portion of the cell 7 pass the conductors 12 and 13 leading to the switch. For keeping these conductors clean and for protecting them from gas which might escape from the switch tank the chamber is provided at the rear with the doors 14 which when closed make the chamber gas tight. The switch tanks are easily accessible from the rear through the room 15 to which lead the side gangways 5. In front of each switch cell is a completely closed mechanism cell 17 entered by the door 18 which when closed is gas tight. Switch operating mechanism 19 having a connection with the switch extending through the wall 8 is mounted in this cell and through the cell extends the lead 13. Accidental contact with the lead 13 by an operator who may have occasion to enter the cell while the circuit is alive is prevented by the wall 20. Inspection or repair work may therefore be carried on in the mechanism cell without danger from the circuit or from oil and gas from the switch. On the front face of the wall 21 of the mechanism cell are mounted the various hand controls, such as the switch mechanism control 22, the wall thus constituting a switch panel. The disconnect switches 24 are mounted on the floor above, and in direct vertical alignment with the switches 10, whereby the grouping of these switches corresponds with that of the main switches, an opening being provided in the upper floor whereby an operator standing in the main gangway may have full view of the disconnect switches.

What I claim as new and desire to secure by Letters Patent of the United States, is,—

1. A switching station comprising a building structure having walls forming a plurality of switch cells closed at their front sides, switches mounted in said cells, said structure having walls forming separate enclosures in front of the switch cells, switch-operating mechanism in said enclosure, and control apparatus therefor mounted on the front faces of said enclosures.

2. A switching station comprising a building structure forming a row of closed front switch cells, having switches therein, a room rearward of said cells into which said switches may be moved, closed cells in front of said switch cells containing switch-operating mechanism, and means on the front faces of said closed cells for controlling the operating mechanism.

3. A switching station comprising a wall structure forming a plurality of cells, each cell having a horizontal wall therein forming upper and lower chambers, an oil circuit breaker in said cell mounted with respect to said horizontal wall so that the electrical connections to the breaker are in the upper chamber, said upper chamber being normally gas-tight with respect to the other parts of the station, a room communicating with said lower chamber into which the breaker may be moved from its cell for inspection, and a normally gas-tight cell containing operating mechanism for said breaker arranged adjacent said first-named cell.

In witness whereof, I have hereunto set my hand this 21st day of June, 1927.

HEINRICH PROBST.